Sept. 6, 1938.  H. L. NEWELL  2,129,534
ELASTIC FLUID TURBINE TURNING MECHANISM
Filed Feb. 17, 1938   2 Sheets-Sheet 1

Inventor:
Heber L. Newell,
by Harry E. Dunham
His Attorney.

Sept. 6, 1938.   H. L. NEWELL   2,129,534
ELASTIC FLUID TURBINE TURNING MECHANISM
Filed Feb. 17, 1938   2 Sheets-Sheet 2
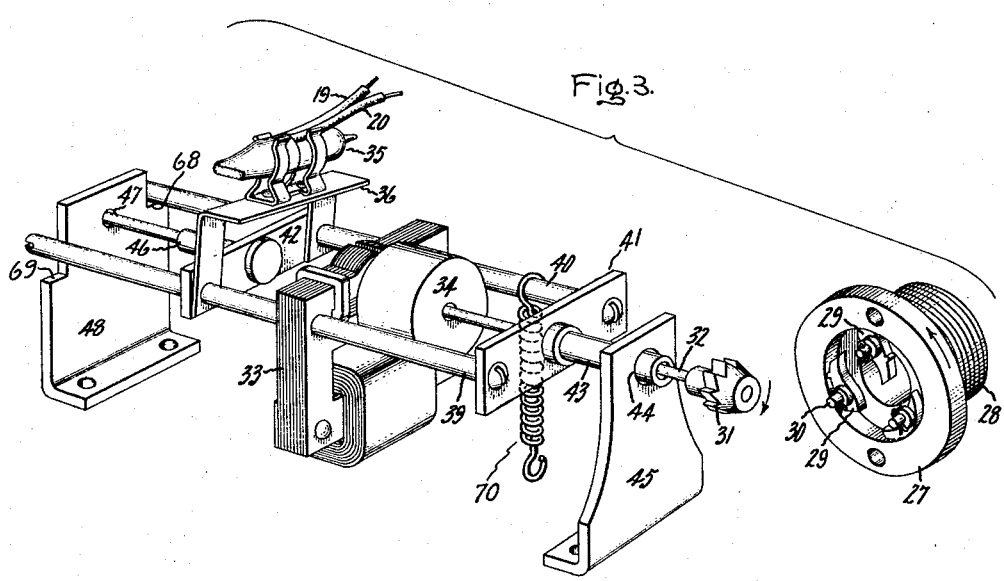
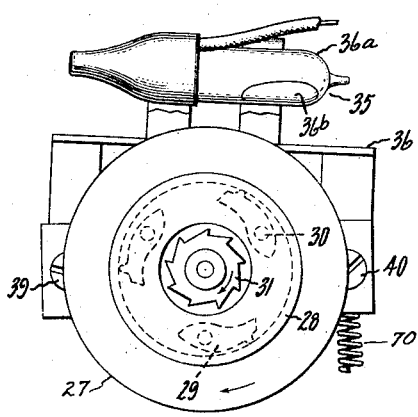
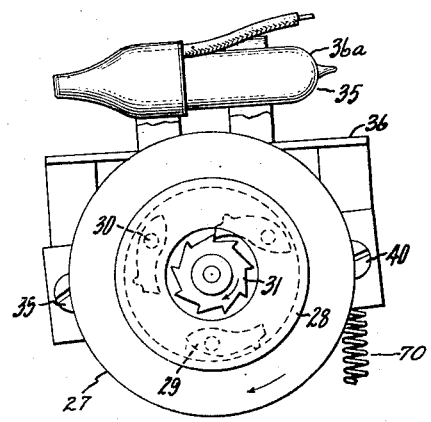
Inventor:
Heber L. Newell,
by Harry E. Dunham
His Attorney.

Patented Sept. 6, 1938

2,129,534

UNITED STATES PATENT OFFICE 2,129,534

ELASTIC FLUID TURBINE TURNING MECHANISM

Heber L. Newell, Stratford, Conn., assignor to General Electric Company, a corporation of New York Application February 17, 1938, Serial No. 191,058

9 Claims. (Cl. 60—1)

The present invention relates to elastic fluid turbine turning mechanisms for mechanically rotating the rotor of a turbine after it is shut down and reaches a low speed of the order of about 1 R. P. M. This turning is usually accomplished by means of an electric motor and a gearing connected to the turbine shaft. The turning of the rotor is desirable in order to effect uniform cooling of the turbine rotor and thereby to prevent sagging of the turbine shaft due to non-uniform cooling and the creeping and stresses caused thereby. An arrangement of this kind is disclosed in the copending application of Alan Howard, Serial No. 191,056, filed on the same date and assigned to the same assignee as the present application.

The object of my invention is to provide an improved construction and arrangement for such turbine turning mechanism whereby the turning motor is automatically connected to the turbine shaft as the turbine is shut down and reaches a definite low speed. A specific object of my invention is to provide an improved circuit breaker or switching mechanism for automatically opening or closing an electric circuit upon the occurrence of a certain operating condition of a turbine or other rotary machine or machine element.

For a consideration of what I believe to be novel in my invention, attention is directed to the following specification and the claims appended thereto in connection with the accompanying drawings.

Figure 1:
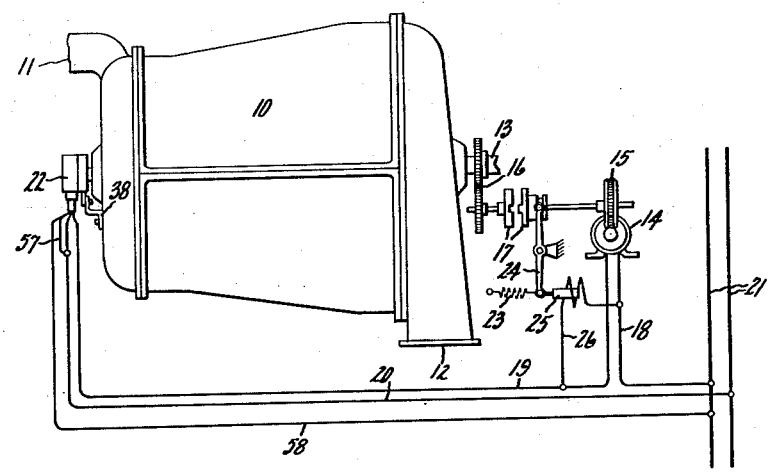
Figure 2:
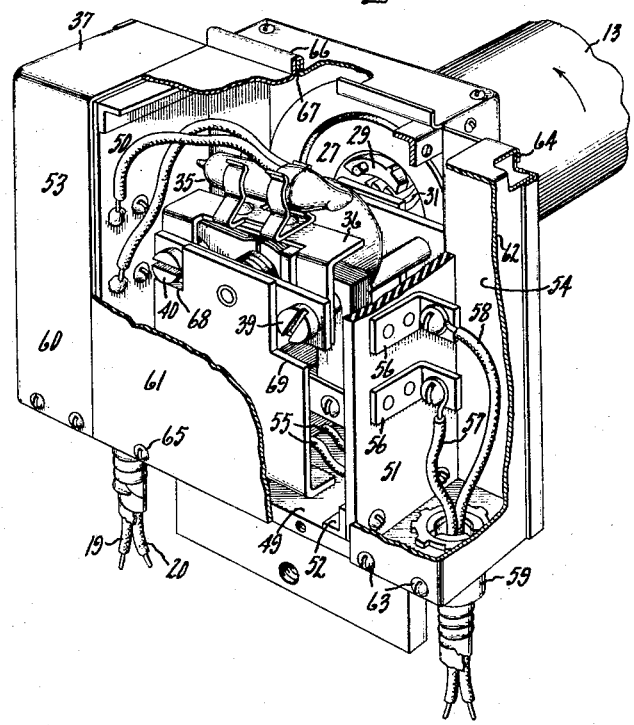

In the drawings, Fig. 1 illustrates a diagrammatic view of a turbine turning mechanism in accordance with my invention; Fig. 2 is a perspective view of a switching mechanism used in the arrangement of Fig. 1; Fig. 3 is an exploded perspective view of certain parts of Fig. 2; and Figs. 4 and 5 show certain elements of Fig. 2 in different operating positions.

The arrangement as shown in Fig. 1 comprises an elastic fluid turbine 10 which has an inlet 11, an exhaust end 12 and a rotor shaft 13. As the turbine is shut down the rotor may be turned at low speed by means of a turning mechanism which in the present instance comprises an electric motor 14 connected to the shaft 13 through gearings 15, 16 and a clutch 17. The motor is connected by conductors 18, 19, 20 to an electric power line 21. The conductors 19, 20 are connected to a switching mechanism or circuit breaker 22 which automatically closes the circuit for motor 14 as the turbine after being shut down reaches a certain low value of, for instance, 1 R. P. M. The clutch 17 has two halves which during normal operation of the turbine are disengaged and held in this position by means of a spring 23 connected to the lower end of a fulcrumed lever 24, the upper end of which is connected to one of the clutch halves. The lower end of the fulcrumed lever 24 is also connected to a solenoid 25 which has an energizing coil 26 connected in parallel with the motor 14 so that upon starting of the motor 14 the coil 26 is automatically energized and causes engagement or closing of the coupling 17 to effect turning of the turbine rotor.

The automatic switching mechanism 22, as shown in Figs. 2 and 3, comprises a ring 27 with a screw-threaded extension 28 for connection to the turbine shaft to be rotated thereby. The ring forms a support for a pawl or, as in the present instance, a plurality of pawls 29. The three pawls shown are uniformly spaced about the center of rotation and pivotally supported on the ring by pins 30. The arrangement is such that as the supporting ring 27 rotates slowly, each pawl drops inward by the action of gravity towards the center of the ring as it is moved into the upper position, as shown in the right-hand portion of Fig. 3 and in Fig. 5. If, however, the ring 27 is rotated at high speed, for instance above 100 R. P. M., the pawls are held outward by the action of centrifugal force acting thereon.

The pawls are cooperatively associated with a ratchet wheel 31 secured to a shaft 32 and driven at low speed, for instance 1 R. P. M., by a motor 33 through a gearing 34. The ratchet wheel 31 is rotated in the same direction as the ring 27 with the pawls 29 as indicated by arrows.

As long as the ring 27 rotates at a speed greater than the ratchet wheel 31, the latter is free to rotate even at speeds below 100 R. P. M. of the supporting ring 27 at which the pawls may drop inward. The pawls at such speed do not interfere with the rotation of the ratchet wheel 31 but merely slide over the teeth of the latter as each pawl reaches a position in which gravity causes it to drop towards the center of the ring 27. As soon, however, as the speed of the ring 27 drops slightly below the speed of the ratchet wheel 31 which, as stated above, may be 1 R. P. M., the pawls drop into the notches formed between adjacent teeth of the ratchet wheel and prevent the latter from running faster than the pawl supporting ring 27 thus reducing the speed of the motor 33. The retarding force is transmitted from the ratchet wheel 31 through the shaft 32 and the gearing 34 to the rotor of the motor 33 which in turn causes a magnetic reaction onto the armature of the motor 33. The latter, as will be more fully described hereafter, is supported for slight angular movement. The aforementioned reaction then causes the armature or stator to rotate slightly, which rotation results in the operation of a switch, in the present instance a mercury switch 35 comprising a vessel 36a containing a small amount of mercury 36b. The vessel is secured to a bracket 36, which latter is held on the armature of the motor 33. The mercury switch is shown in Fig. 4 in its normal position and in Fig. 5 in its tipped position in which the mercury is moved toward the left-hand end to bridge two contacts inside the vessel thereby connecting the conductors 19, 20 and causing closing of the electric circuits for the relay 25 and the motor 14. Closing of this circuit, as pointed out above, puts the turbine turning mechanism into operation to slowly turn the turbine rotor. The switching mechanism forms a compact unit with the motor enclosed in a casing 37 secured to the turbine casing by a bracket 38 (Fig. 1). The armature of the motor 34 is secured to two parallel rods 39 and 40. The right-hand ends (Fig. 3) of these rods are fastened to a plate 41 and the left-hand portions of the rods are secured to another plate 42. A hollow shaft stub 43 is centrally secured to the plate 41 and rotatably supported in a bearing 44 formed in a bracket 45. The bore of this stub 43 forms in turn a bearing support for the shaft 32 for the ratchet wheel. Another shaft stub 46 is secured to the central portion of the plate 42 and rotatably supported on a bearing 47 formed in another bracket 48. The two brackets 45 and 48 are secured to a bottom plate 49 of the casing 37. Two plates 50 and 51 are fastened inside the casing to the bottom plate by means of angle irons 52. These plates together with the adjacent portions of the casing form connecting boxes 53 and 54 for the circuits of the switch 35 and the motor 33 respectively. The motor 33 has leads 55 connected to terminals 56, which latter are fastened to the insulating plate 51. The terminals 56 in turn are connected to conductors 57 and 58 projecting through a cable connector and locknut 59 in the bottom of the box. The conductor 57 (Fig. 1) is connected to the conductor 20 and the conductor 58 is connected directly to the power line 21. The arrangement within the connecting box 53 for the mercury switch 35 is similar to that of the box 54, forming an outlet for the conductors 19 and 20.

The outer cover of the casing of the switching mechanism comprises three parts 60, 61 and 62, the parts 60 and 62 forming covers for the connecting boxes 53 and 54 respectively and the part 61 covering the motor 33 and the switch 35. Thus, when the connection within the connecting box 54 has to be changed, it is only necessary to remove the cover 62. Each of the three parts 60, 61, 62 is fastened to the bottom plate 49 by two screws. The cover 62, is secured in position by two screws 63 and has a lip 64 engaging the rear side of the casing. The part 61 is secured to the bottom by two screws 65 and has a top portion forming a fold 66 engaging a lip 67 of another portion of the casing.

During normal operation of the turbine, that is, with the ratchet wheel 31 free to rotate, the motor 33 with the rods 39, 40 is in the position indicated in Figs. 2 and 3 in which the end portion of the rod 40 engages a shoulder 68 formed on the bracket 48. This shoulder forms in substance a stop against rotation of the armature in one direction. As the turbine 10 slows down and reaches a speed below that of the ratchet wheel 31, one of the pawls 29 engages the ratchet wheel, as indicated in Fig. 5, thereby causing angular motion of the armature of the motor 33 with the rods 39, 40. This motion is limited by another shoulder 69 formed on the bracket 48 forming in substance a stop limiting angular movement of the motor armature while the ratchet wheel is prevented from free rotation at normal speed of, for instance, 1 R. P. M. The motor 33 together with the gearing 34 is preferably the synchronous type as used, for instance, in alternating current clocks.

The armature 33 is normally held in a fixed position in which the rod 40 engages the stop 68 by means of a tension spring 70 (Fig. 1) connected to the rod 40 to pull it downward. If during operation the ratchet 31, which broadly constitutes an element responsive to external resistance encounters such resistance preventing it from freely rotating, the armature 33 of the motor is turned against the biasing force of the spring 70 until the rod 39 engages the stop 69. If thereupon the resistance against movement of the ratchet wheel 31 is removed, thus in case of a steam turbine, if steam is turned on again, the armature 33 with the elements connected thereto is returned to its original position by the action of the spring 70. The fact that the armature 33 is normally restrained to a fixed or original position and will always return to such position after external resistance towards free movement of the motor has been removed is especially important in the operation of elastic fluid turbines in that these features render it impossible that the turbine turning gearing may be connected to the shaft while the turbine is running at high speed. Another important feature of my invention is the elimination of means for manually connecting the turbine gearing in that heretofore it has happened that such gearing was connected at high turbine speeds which often resulted in destruction thereof.

Thus, by my invention a turbine turning mechanism is automatically put in operation as the turbine is shut down and reaches a low speed of about 1 R. P. M. The switching mechanism according to my invention includes a rotatable element with a pawl or pawls connected to the turbine and another rotatable element preferably in the form of a ratchet wheel cooperatively associated with the pawls and independently driven by a motor and gearing at a speed at which it is desired to effect the operation of the turbine, in the present instance to effect operation of the turbine rotor turning mechanism. The motor according to my invention has an armature rotatably supported to permit angular movement thereof as the ratchet wheel is prevented from free rotation, that is, retarded by engagement with one of the pawls. The angular movement of the motor is limited in both directions by stops formed by shoulders on a bracket for supporting the motor. The electric switch, in the present instance, is in the form of a mercury switch comprising a vessel with a small amount of mercury therein for closing two metal contacts in a certain position of the vessel.

The switching mechanism constitutes broadly a circuit breaker. It may be used for opening or closing an electric circuit upon the occurrence of a certain condition in the operation of a turbine or like rotary machine or machine element. Thus, while the particular switching mechanism described above is useful in the operation of a turbine rotor turning mechanism, it may be applied wherever it is desired to close a circuit or to indicate a predetermined speed or other condition of a movable machine element.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States is:

1. Elastic fluid turbine turning mechanism including the combination of an elastic fluid turbine having a rotor with a shaft, and means for mechanically rotating the rotor at low speed as the turbine is shut down and reaches a predetermined low speed, said means comprising a drive motor and a gearing connected to the shaft and a mechanism for automatically connecting said motor at a fixed low turbine speed, said mechanism including a support with a pawl connected to the turbine shaft, a ratchet wheel cooperatively associated with the pawl and a motor for driving the ratchet wheel.

2. Elastic fluid turbine turning mechanism including the combination of a turbine having a rotor with a shaft, and a turbine turning mechanism for rotating the rotor at low speed, said mechanism comprising an electric motor, a gearing and a clutch connecting the motor to the shaft, and switching means for automatically connecting the motor and engaging the clutch as the turbine reaches a fixed low speed, said switching means including a support with a plurality of pawls spaced about the center of and connected to the turbine shaft, a ratchet wheel cooperatively associated with the pawls, an electric motor having an armature and a rotor, a reducing gearing connected between said rotor and the ratchet wheel, means for rotatably supporting the armature and forming stops limiting angular movement thereof and a switch secured to the armature to be opened and closed upon rotation thereof.

3. A mechanism for use as a circuit breaker or a speed indicating device comprising a motor having a rotor and a stator, a ratchet wheel driven by the rotor, rotatable pawl means cooperatively associated with the ratchet wheel, and means for rotatably supporting the stator.

4. A mechanism for use as a circuit breaker and a speed indicating device comprising an electric motor having a rotor and an armature, a ratchet wheel driven by the rotor, rotatable pawl means cooperatively associated with the ratchet wheel, means for rotatably supporting the armature, and means limiting angular movement of the armature.

5. A mechanism for use as a circuit breaker and a speed indicating device comprising an electric motor having a rotor and an armature, a ratchet wheel driven by the rotor, rotatable pawl means cooperatively associated with the ratchet wheel, means for rotatably supporting the armature, means limiting angular movement of the armature, and a switch element mechanically secured to the armature to be opened and closed by rotation of the armature.

6. A mechanism for use as a circuit breaker and a speed indicating device comprising an electric motor having a rotor and an armature, a ratchet wheel driven by the rotor, rotatable pawl means cooperatively associated with the ratchet wheel, means for rotatably supporting the armature, means limiting angular movement of the armature, and spring means for normally holding the armature in a fixed position and for returning it to this position upon angular movement.

7. An indicating mechanism including the combination of an electric motor having a rotor with a shaft and a stator, means rotatably supporting the stator and normally holding it in a fixed position, an element mechanically connected to the rotor shaft and responsive to external resistance to effect angular movement of the stator upon encountering such resistance, and means actuated in response to angular movement of the stator.

8. A mechanism responsive to an operating condition of a machine comprising a constant speed motor having an armature and a rotor, a support for rotatably supporting the armature, stops limiting rotary movement of the armature, and means for effecting rotation of the armature in response to an operating condition of a machine comprising pawl and ratchet elements, one of the elements being connected for rotation by the rotor and the other element being actuated by such machine.

9. A mechanism responsive to an operating condition of a machine comprising a constant speed motor having an armature and a rotor, a support for rotatably supporting the armature, means for effecting rotation of the armature in response to an operating condition of a machine comprising pawl and ratchet elements, one of the elements being connected for rotation by the rotor and the other element being actuated by such machine, and means responsive to angular movement of the armature including an element actuated in response to movement of the armature.

HEBER L. NEWELL.